UNITED STATES PATENT OFFICE.

BENJAMIN J. TIMBY, OF RIDGEWAY, NEW YORK, ASSIGNOR TO HIMSELF AND DAVID P. HOOKER, OF SAME PLACE.

IMPROVEMENT IN COMPOSITIONS FOR PROTECTING TREES.

Specification forming part of Letters Patent No. 203,674, dated May 14, 1878; application filed February 4, 1878.

*To all whom it may concern:*

Be it known that I, BENJAMIN JOHNSON TIMBY, of Ridgeway, in the county of Orleans and State of New York, have invented a new and useful Improvement in a Compound for Invigorating Trees, of which the following is a specification:

The object of this invention is to furnish an improved mode of treating apple, pear, quince, and plum trees, to prevent and cure blight, improve the fruit, cause it to remain upon the trees until fully ripe, and prevent it from being injured by worms or insects.

The invention consists in a compound for invigorating trees and protecting them from insects, formed of sulphur, wood-soot, and balm-of-Gilead buds, in the proportions and manner hereinafter set forth.

This compound is formed of sulphur, wood-soot, and balm-of-Gilead buds, in about the proportion of twenty pounds of sulphur, two pounds of soot, and nine hundred balm-of-Gilead buds.

In preparing this compound the sulphur is pounded fine and the wood-soot is thoroughly mixed with it. The balm-of-Gilead buds may be put in now or afterward, as may be desired.

Having thus described my invention, I claim as new and desire to secure by Letters Patent—

A compound for invigorating trees and protecting them from insects, formed of sulphur, wood-soot, and balm-of-Gilead buds, in the proportions substantially as herein set forth and described.

BENJAMIN JOHNSON TIMBY.

Witnesses:
JEREMIAH J. V. SCHUYLER,
JAMES W. PRIDDY.